United States Patent

Cherry et al.

[11] Patent Number: 5,929,421
[45] Date of Patent: *Jul. 27, 1999

[54] METHOD AND APPARATUS FOR RECOGNIZING AND ASSEMBLING OPTICAL CODE INFORMATION FROM PARTIALLY SCANNED SEGMENTS

[75] Inventors: Craig D. Cherry, Eugene; Donald D. Dieball, Springfield, both of Oreg.

[73] Assignee: Spectra-Physics Scanning Systems, Inc., Eugene, Oreg.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/898,704

[22] Filed: Jul. 22, 1997

Related U.S. Application Data

[63] Continuation of application No. 07/995,270, Dec. 22, 1992, Pat. No. 5,493,108, which is a continuation-in-part of application No. 07/961,188, Oct. 14, 1992, abandoned, and a continuation of application No. 08/577,906, Dec. 4, 1995, abandoned.

[51] Int. Cl.[6] ........................................... G06R 7/10
[52] U.S. Cl. .............................. 235/462.12; 235/462.01; 235/462.07; 235/462.16
[58] Field of Search ................................. 235/462, 463, 235/454, 467, 462.12, 462.01, 462.07, 462.16

[56] References Cited

U.S. PATENT DOCUMENTS

| | | | |
|---|---|---|---|
| 4,289,957 | 9/1981 | Neyroud et al. | 235/462 |
| 4,308,455 | 12/1981 | Bullis et al. | 235/463 |
| 4,409,469 | 10/1983 | Yasuda et al. | 235/463 |
| 4,488,678 | 12/1984 | Hara et al. | 235/463 |
| 4,608,489 | 8/1986 | Ramsey et al. | 235/462 |
| 4,717,818 | 1/1988 | Broockman et al. | 235/462 |
| 4,861,972 | 8/1989 | Elliott et al. | 235/462 |
| 4,866,257 | 9/1989 | Elliott et al. | 235/436 |
| 4,963,719 | 10/1990 | Brooks et al. | 235/462 |
| 4,973,829 | 11/1990 | Ishida et al. | 235/462 |
| 4,992,650 | 2/1991 | Somerville | 235/462 |
| 5,028,772 | 7/1991 | Lapinski et al. | 235/467 |
| 5,045,677 | 9/1991 | Okamura | 235/462 |
| 5,124,538 | 6/1992 | Lapinski et al. | 235/467 |
| 5,144,118 | 9/1992 | Actis et al. | 235/462 |
| 5,194,722 | 3/1993 | Mergenthaler et al. | 235/463 |
| 5,241,164 | 8/1993 | Pavlidis et al. | 235/462 |
| 5,276,316 | 1/1994 | Blanford | 235/462 |
| 5,278,398 | 1/1994 | Pavlidis et al. | 235/462 |
| 5,457,308 | 10/1995 | Spitz et al. | 235/462 |
| 5,493,108 | 2/1996 | Cherry et al. | 235/454 |

FOREIGN PATENT DOCUMENTS

| | | |
|---|---|---|
| 0431264 | 6/1991 | European Pat. Off. . |
| 0436072 | 7/1991 | European Pat. Off. . |

*Primary Examiner*—Michael G. Lee
*Attorney, Agent, or Firm*—Lyon & Lyon LLP

[57] ABSTRACT

In an optical scanning system, a method and apparatus for decoding labels of single or multiple block formats by stitching together partial label segments obtained from multiple optical scans across the label is provided. Partial scans are decoded into strings of character information which are assembled by locating sub-strings of common elements between two strings. Strings in which the common elements occur at the ends are merged by deleting one set of redundant common characters and joining the remaining characters in proper sequence. The method assembles strings in which the common elements occur in the middle of one or both strings by testing for valid string combinations made by deleting characters adjacent to the common sub-string, on opposing ends of each string, and merging the resulting strings. Feature characters, parity information, checksum digits, and other label structural characteristics are used to verify resulting strings and completed blocks and labels. Processing continues until all string combinations are tested and/or a complete label is formed.

17 Claims, 11 Drawing Sheets

FIG. 2
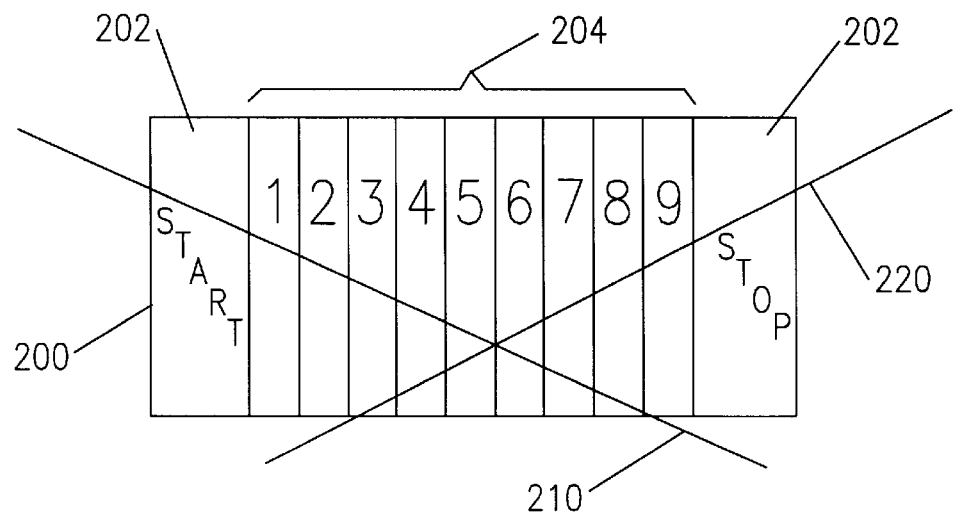
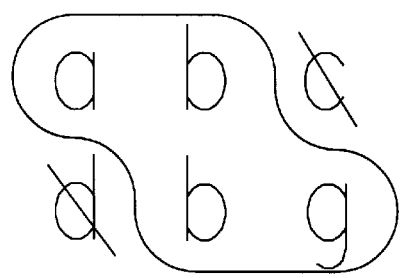
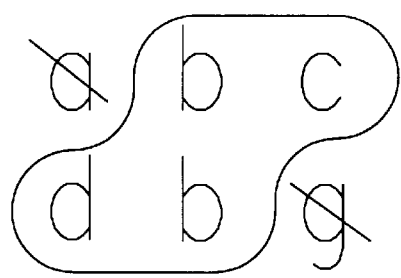
FIG. 3a          FIG. 3b
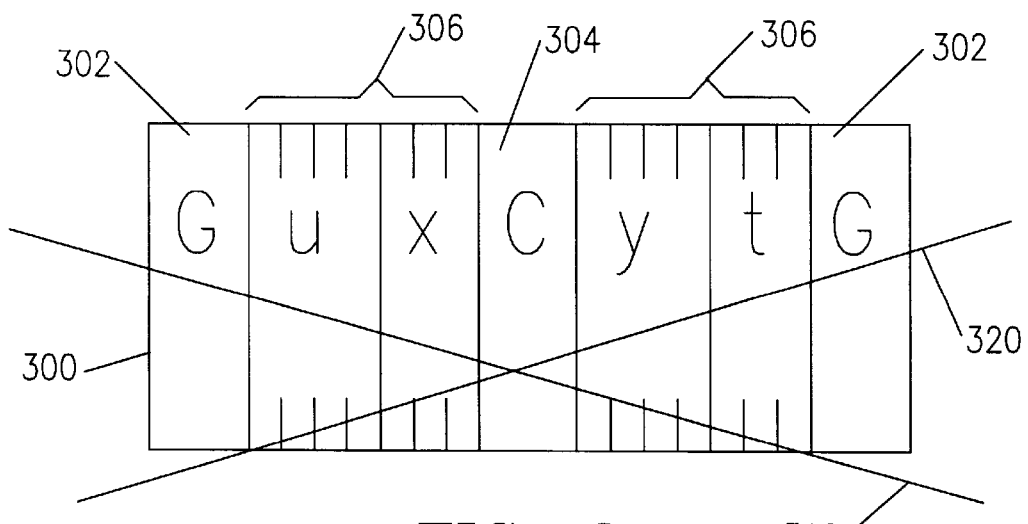
FIG. 3c ately, the character value 5 may be represented as 0110001 using odd parity or 1001110 using even parity. Likewise, the character 3 may be represented as 0111101 using odd parity or 1000010 using even parity.

METHOD AND APPARATUS FOR RECOGNIZING AND ASSEMBLING OPTICAL CODE INFORMATION FROM PARTIALLY SCANNED SEGMENTS

RELATED APPLICATION DATA

This application is a continuation of application Ser. No. 07/995,270, filed Dec. 22, 1992, now U.S. Pat. No. 5,493,108 which is a continuation-in-part of now-abandoned application Ser. No. 07/961,188, filed Oct. 14, 1992, and a continuation of application Ser. No. 08/577,906, filed on Dec. 4, 1995, now abandoned.

MICROFICHE APPENDIX

This application includes two (2) Microfiche Appendix A and Appendix B, respectively.

COPYRIGHT NOTICE/AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The field of the present invention relates to data reading devices and, in particular, to optical code scanners or other label scanning and decoding systems of the type that are designed to read labels having information which may be presented in any one of a number of different codes commonly in use. More particularly, it relates to a system and method for recognizing label presence and combining data (decoded) from partial label segments read from multiple scans in order to assemble therefrom data comprising a valid label.

BACKGROUND OF THE INVENTION

Existing labels encode information in a variety of formats and are commonly employed in applications such as inventory control systems and, most familiarly, affixed to consumer goods for retail store check-out, among others. Typically, the information encoded on each label uniquely identifies the product or product line. Such information, once decoded, can be used to identify other information, e.g., price, associated with the labelled object.

Optical scanning systems use various apparatus and methods for the purpose of reading such labels, identifying the particular label format, and decoding the information stored in the label. In the case of bar code scanners, for example, a typical system has one or more light sources, such as a laser or laser diode, which are used to scan the label. Traditional labels are ordinarily composed of a series of parallel dark and light areas, e.g., bars and spaces. A collection subsystem detects at least a portion of the light reflected from the label, distinguishes between dark and light areas, and converts the optical information into an electrical signal that can be recognized by a computer or other electronic system.

Labels, e.g., bar codes or other such symbols, commonly include characters (which can, e.g., be alpha-numeric) defined by a number of bars and spaces. Exemplary of this is the Universal Product Code (UPC) label in which each character is made up of two bars and two interleaved spaces. The width of each character is measured in units called "modules" with each character being seven modules in width. The width of any particular bar or space within the character representation is between one and four modules. The character value depends on the relative width in modules of the two bars and two spaces it comprises. For example, indicating bars with a 1 and spaces with a 0, a sequence of 111 would represent a bar which is three modules in width.

Some codes make use of parity formats to form alternative representations for the digits 0 through 9. These alternate formats may be utilized in different locations on a label thus providing means for verifying accuracy of data. For example, UPC labels, with the exception of UPC-E labels, are comprised of right and left segment halves. Characters in the left segment are of odd parity and, when scanned from left to right, all begin with spaces. Characters in the right segment are of even parity and, when scanned from left to right, all begin with bars. Thus, the character value 5 may be represented as 0110001 using odd parity or 1001110 using even parity. Likewise, the character 3 may be represented as 0111101 using odd parity or 1000010 using even parity.

Additionally, many labels utilize feature characters, such as center or guard characters, as delimiters or to separate segments of the label. Most UPC labels, as noted above, have left and right segment halves. These segment halves are separated by a center band character which typically comprises two single module bars and three interleaved single module spaces. The beginning and end of the label are delimited by a pair of guard characters, each of which typically comprises two single module bars and one interleaved, single module space. The bar/space representations of these feature characters are unique from that of data characters to enhance detection and decoding capability. Furthermore, an unprinted margin area or white space is typically located outwardly of the two guard characters.

In addition to the UPC formats, a variety of other label formats exist which vary, among other ways, in structure, content, parity requirements, and type of feature characters. Code 39 and Code 128, for example are both non-segmented label formats, i.e., they have no center feature characters separating two or more segments of bars. Furthermore, many new label encoding schemes have been developed which have differing pattern structures for the dark and light areas. Exemplary of these newer code types are the stacked bar code formats referred to as Code 49 and PDF 417.

As a practical matter, recovering information from optical code labels poses many difficulties which must be overcome by a scanning system. For example, in order to read a label completely, i.e., from left guard character or margin to right guard character or margin, in a single optical pass, the label must be properly oriented with respect to the scanning beam. Failure to read in a single pass results in partial scans of the label which must be assembled properly in order to formulate valid label information, otherwise the object must be re-positioned and re-scanned until a successful read is obtained.

Added difficulties are encountered in recovering information from labels which are torn, folded, split or similarly damaged. Likewise, differences in package configurations, label sizes and locations, and scanner positions, among other factors, as well as the multitude of optical code formats currently in use, serve to exacerbate these problems. As a result, partially read labels are both more likely to occur and more difficult to decipher. In many applications, such as store check-out stands, this translates to a need for high operator concentration and dexterity yet results in non-optimum speed or efficiency, since the operator must take care to ensure the object to be scanned is properly positioned (or must reposition and rescan repeatedly for a valid reading).

Certain methods of assembling or concatenating data read on partial scans attempt to address these difficulties. For example, such methods are disclosed by U.S. Pat. No. 4,973,829, U.S. Pat. No. 4,717,818, European Patent Application 0 436 072 A2, and European Patent Application 0 431 264 A2. However, these existing methods are inherently limited in their ability to detect and correct for inaccurate data reads within partial scans.

Problems in decoding labels may occur, for example when the label is folded, split, torn or similarly damaged, or when a label is mis-framed or read diagonally across a top or bottom border resulting in the reading of incomplete or degraded character data. In such cases, data on either end of an input string may be inaccurately read, yet may appear to be an otherwise structurally valid character. Prior systems and methods have difficulty discerning these inaccuracies and/or resolving the ambiguities caused by reading two different but apparently valid characters for a particular position.

For example, existing systems and methods are not able to reject inaccurate (though structurally valid) data portions at the end of an input string and associate or combine only the remaining accurate data. Thus, existing stitching methods would reject the ambiguous input string and wait for re-scanned data to be entered, resulting in reduced speed and efficiency. Consequently, reading of some labels may be impossible using existing methods where the label condition makes the entry of such degraded or ambiguous data inevitable.

Additional limitations in certain of these existing systems and methods result from the required use of bar code fragment position data relative to the ends of the scan line in order to assemble the fragment in the proper location. Useful position information of this sort is unavailable in high speed, operator sensitive applications employing multiple scan line scanner operation, such as used in grocery store systems.

Certain existing systems are further limited by the assembly of partial data into complete labels occurring at the level of raw data, i.e., prior to decoding character information. For many label formats, any combination of bar and space widths may appear to be a valid character at this level and, thus, these systems would unsuccessfully attempt to process and combine this data with other strings. In addition, the inability to process strings which comprise half or less than half of a segment or block of a label is another limitation of prior art since many smaller scanned lines remain unprocessed that might otherwise have allowed for complete label information to be assembled.

Yet another limitation to some existing systems is the need to identify and reference margin space outside of the label periphery in order to identify label ends and correctly interpret and assemble partial segments. This requirement can lead to rejection of some otherwise beneficial scan lines in mis-framing or diagonal read situations and may pose difficulties with respect to some package designs where advertising graphics, stray printing, or color contrasts between the label and surrounding package design may interfere with margin clarity.

Accordingly, there is a need for a better system which is capable of recognizing labels, including segments of labels, and accurately stitching multiple partial scan information to assemble complete label information.

SUMMARY OF THE INVENTION

The present invention is a system and method for recognizing and decoding optical code labels. A preferred embodiment of the present invention includes the steps of identifying partial label segments from multiple label scans, storing decoded partial label segments once identified, and stitching complete label blocks from the store of partial label segments to yield complete label information. Stitching is accomplished by combining or otherwise associating partial label segments, or strings, when certain matching conditions are met. Such strings may contain a guard character and adjacent data characters or a center character and adjacent data characters but need not contain both guard and center characters.

A match may comprise an exact overlap of end characters between two strings, an identity of some intermediate characters within two strings, or a combination of end characters of one string in identity with intermediate characters of another. Feature characters (e.g., left/right guards or center), data parity information, and other label characteristics (which, e.g., may include check digits) are used to verify string orientation and to validate resulting string combinations and label blocks. The process is repeated on all available strings as necessary to generate complete block and label information from partial segment data.

The system and method of the present invention is adaptable to a wide variety of label formats. Although the definition of a block may be different depending on the code in question, for the purposes of this disclosure the term "block" shall include, for example, single block elements of single block labels (e.g., UPC-A, UPC-E, EAN-13, and EAN-8) or of multiple-block labels (such as UPC-D1 through D5 and the Japanese EAN two label pairs), as well as sub-blocks of the type separated by white space in the Blk-1, Blk-6 and Blk-7 codes. Similar definitions, consistent with the operations noted herein, are applicable to other optical label formats as well.

Accordingly, the present invention provides one or more of the following objects and advantages:

accurately recognize and decode optical labels;

provide accurate assembly of label information from multiple partial scans with confidence that the entire label has been scanned, no data has been duplicated, and the data has been put into the correct order;

have the capability and versatility to perform stitching on labels of various formats including multi-block labels as well as single-block labels and others;

improve stitching performance by working at the decoded character level, as opposed to raw data, and using feature characters and other internal label information to build up labels with a valid high level structure;

have the ability to assemble partial segments containing inaccurate data at a leading or trailing end, i.e., where identity of characters between strings occurs intermediately to one or both strings as opposed to only at an end of both strings;

process partial segments of a size smaller than half the overall length in characters of the complete segment to be assembled;

have the capability to recognize labels and perform stitching of partial label segments without requiring information as to label margins or white space, or the position of partial segments with respect to the scan lines;

perform stitching in a speedy and efficient manner while alleviating pressure on scanner operator to accurately align the labelled object; and, increase read successes and improve accuracy of stitching in situations where label condition is degraded by tears, splits, folds, etc.

Other objects and advantages of the present invention will become apparent from a review of the accompanying drawings and the detailed description which follows.

BRIEF DESCRIPTION OF THE DRAWINGS

FIG. 2 is a simplified representation of a label depicting partial scans resulting in no inaccurate data at their ends;

FIG. 3(a) is a pictorial representation of the processing of two scan line strings having inaccurate data at the ends thereof, using the method of the present invention, to form a processed string which may be checked for validity;

FIG. 3(b) is a pictorial representation of the alternate processing of the two scan line strings of FIG. 3(a), using the method of the present invention. to form an alternate processed string which may be checked for validity;

FIG. 3(c) is a simplified representation of a UPC label depicting partial scans having inaccurate but possibly structurally valid data at the ends thereof.

DETAILED DESCRIPTION OF THE PREFERRED EMBODIMENT

With reference to the drawings, a preferred embodiment of the present invention is described as follows.

Figure 1:
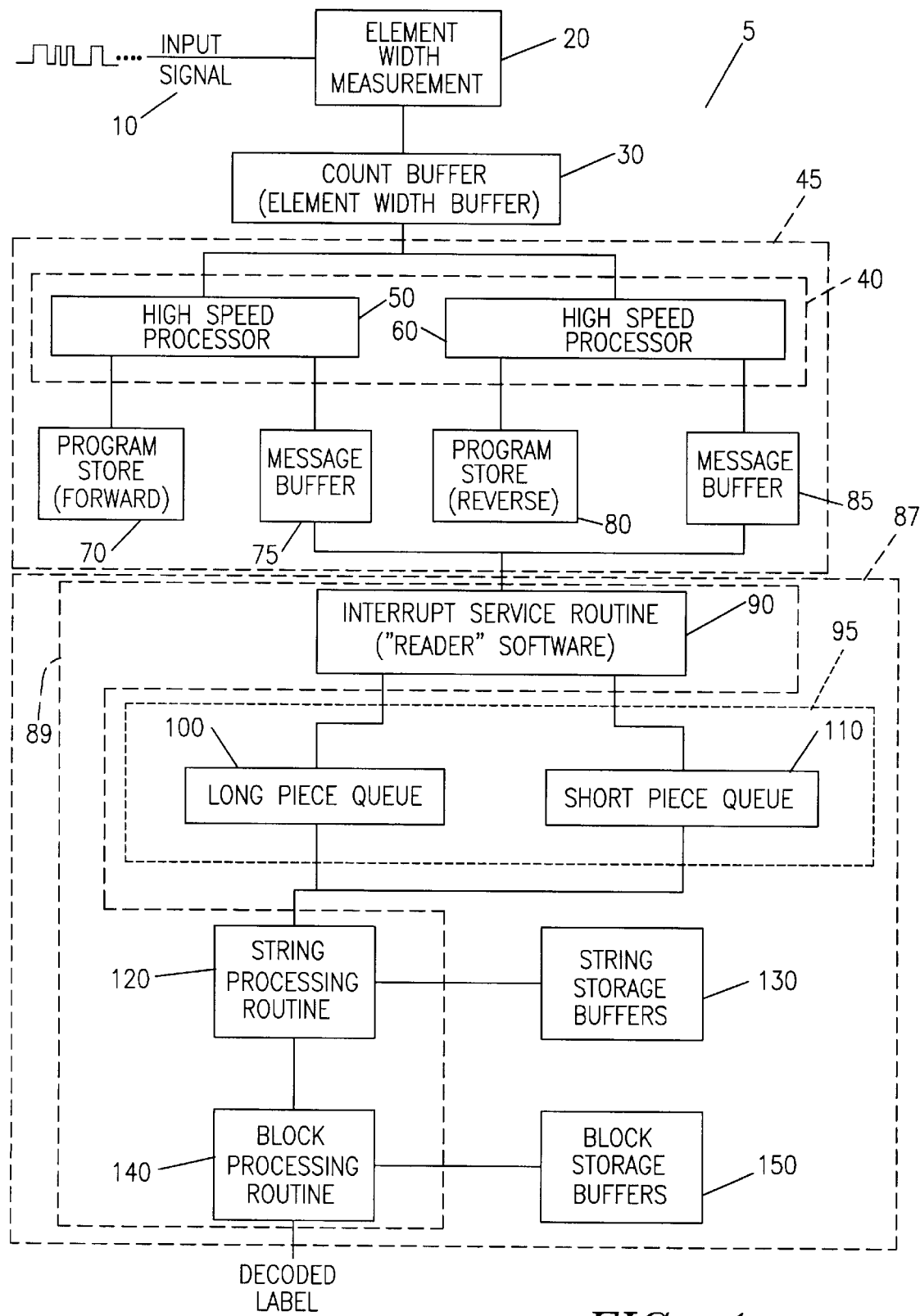
FIG. 1 is a block diagram depicting the system and method of recognizing and assembling label information according to the present invention.

Referring to FIG. 1, the system 5 of the present invention for scanning optical code labels, recognizing their format, and accurately interpreting their data is depicted. The system 5 operates on an electrical input or scan signal 10. The signal 10 may, for example, be generated by scanner circuitry or other means in response to detection of light reflected back from a label. Such a scan signal 10 may have first and second levels representing dark and light areas, e.g., bars and spaces, respectively, and may comprise a binary signal. Various methods exist for generating such signals which are of a type well known to the laser scanner art. The system is provided with element width measurement circuitry 20 for measuring the widths between transitions on scan signal 10. These widths correspond to those of a bar or space scanned depending on the state of scan signal 10. Measured widths are stored in an element width buffer 30.

One or more processors 40, which may be high speed processors, are then employed to examine the contents of the element width buffer 30, identify label segments derived from the scan signal 10 which contain at least one feature character (e.g., this may be a left or right guard character or a center character if a UPC label is scanned) and one or more data characters, and convert the binary information into its decoded characters for storage as a data string. Such processing may be accomplished in a variety of ways, but is advantageously done by an integrated circuit chip 45, including a first microprocessor 50 and a second microprocessor 60, specially designed for performing this task, a first program store 70 and a first message buffer 75 associated with the first microprocessor 50, and a second program store 80 and second message buffer 85 associated with the second microprocessor 60.

The integrated chip may include one microprocessor operating on the undecoded character information in a forward direction while a second microprocessor operates in parallel on the undecoded character information in a reverse direction, i.e., reading the last character scanned first, for the purpose of increasing speed and efficiency. Each microprocessor converts the undecoded character information into decoded data strings and temporarily stores these strings in the respective message buffers, 75 and 85. Both decoders operate on feature characters as key decoding points. It will be appreciated that no surrounding margin or white space in the undecoded character information is needed to successfully decode label character information. As a result, all subsequent processing for label stitching inherits this advantageous characteristic.

By way of example, such a processing system is described in detail in U.S. Pat. No. 5,144,118, to Actis et al, entitled "BAR CODE SCANNING SYSTEM WITH MULTIPLE DECODING MICROPROCESSORS", issued Sep. 1, 1992, and incorporated herein by reference. As applied in a preferred embodiment of the present invention, microfiche appendix A sets forth actual source code, i.e., software listings of the routines used to implement such processing utilizing hardware such as that described herein. However, the above method represents just one method of processing undecoded scan signal data having one or more feature characters present into decoded character strings for further processing and assembly as described below. Other suitable methods for processing may be utilized within the scope of the present invention.

The system 5 also includes assembly subsystem 87 for processing decoded data strings comprising partial segments and assembling these segments to obtain complete label information. The assembly subsystem 87 may include at least one processing component 89 (e.g., a microprocessor) for accomplishing such processing and assembly. The processing component 89 includes an interrupt service routine 90 which reads the data strings from the message buffers 75 and 85 and transfers them to a storage area 95. The storage area 95 may contain a long piece queue 100 and a short piece queue 110 for storing strings of different lengths or including differing numbers of feature characters, although a single queue or more queues may readily be employed for the same task. For example, partial segment strings identified as containing at least one feature character and several data characters may conveniently be stored in short piece queue 110 while strings containing two or more feature characters may be stored in the long piece queue 100.

Although the embodiment herein described utilizes a queue(s) for intermediate storage of strings prior to processing and assembly, this is only one means of handling the decoded string data. Other storage means (buffers, stacks, registers, and the like) may be interchangeably employed for this purpose. Furthermore, the need for any such storage means at this point may be obviated where the processing component 89 performing the processing and assembly of decoded strings is capable of operating at a faster speed than the decoded string data is presented.

The strings stored in queues 100 and 110 are then processed by a string processing routine 120 within the processing component 89. Although processing is preferably accomplished by software, it will be noted that such processing may also be accomplished either fully or partially by hardware. The string processing routine 120 examines the contents of each of the strings stored in queues 100 and 110, giving priority to the long piece queue 100, and, if necessary, compares and combines incomplete strings as further described herein.

The string processing routine 120 first checks if a particular string to be processed is a sub-string of, or is identical to, an existing string, e.g., one contained in string storage buffer 130. It also checks if an existing string in buffer 130 is a sub-string of the string to be processed. If either condition is found to exist, the superfluous string is automatically discarded. In addition, if any strings to be processed form complete blocks they are transferred to a block storage buffer 150 in preparation for processing by block processing routine 140 as further described herein.

The string processing routine 120 compares and assembles incomplete strings forming partial segments into larger strings, complete blocks, or labels, as the case may be. To this end, unprocessed strings from the storage area 95 are individually compared with existing strings in the string storage buffer 130 to determine if assembly of string combinations is possible. The first stage of such assembly processing may best be understood with reference to FIG. 2 which depicts a simplified representation of a label 200 having start and stop feature characters 202 and nine data characters 204. A first scan line 210 and a second scan line 220 represent possible read paths of the scanner across the label such that all data read is accurate at the ends. The assembly subsystem 87 decodes the first scan line 210 and the second scan line 220 to yield, respectively, the following data strings (assuming left to right read paths for both scan lines):

String 1: (Start) 1 2 3 4 5 6
String 2: 5 6 7 8 9 (Stop).

Upon selecting the strings for comparison (e.g., string 1 may be an existing string in string buffer 130 and string 2 an unprocessed string from storage area 95), the string processing routine 120 checks first for the presence of matching or overlapping characters at either of the opposing ends of each string, i.e., the left side of string 1 and the right side of string 2, or vice versa. If such identity of end characters is detected then the strings are merged into a single string. Thus, in the immediate example shown above, the character sequence '5 6' is detected at the right end of string 1 and the left end of string 2. Consequently, the string processing routine 120 attempts to merge strings 1 and 2 into the processed string:

(Start) 1 2 3 4 5 6 7 8 9 (Stop).

In this regard, redundant overlapping characters are eliminated and the strings are joined while maintaining the proper positional relationships to the common sub-string of characters. The string processing routine 120 then checks the resulting processed string for parity and structural relationships in order to verify that a valid string is formed. If the resulting, verified string forms a valid block, it is transferred to the block storage buffer 150 as above. If no valid block has been formed, the resulting string is then further processed by string processing routine 120 to determine if additional assembly with other existing strings in string buffer 130 is possible. Any resulting string (or any unprocessed string from storage area 95) for which all combinations of merge possibilities have been exhausted is stored in the string buffer 130 and becomes an existing string for possible later assembly.

Additionally, the present invention is capable of assembling strings that have been scanned in a reverse direction. Assume that the label positioning with respect to the scanner was such that the first scan line 210 of FIG. 2 scanned the label in the forward (i.e., left to right) direction, while the second scan line 220 scanned in the reverse direction (i.e., right to left). In such a case, the system 5 would decode the following strings 1 and 2 from the scan lines 210 and 220, respectively:

String 1: (Start) 1 2 3 4 5 6
String 2: (Stop) 9 8 7 6 5.

Realizing that string 2 represents a reverse scan line, however, the system 5 would invert this data to form:

String 2': 5 6 7 8 9 (Stop).

As before, overlapping characters are detected between string 1 and string 2', and the processed string:

(Start) 1 2 3 4 5 6 7 8 9 (Stop)
again results.

It should be noted that there may be some minimum requirement of overlap prior to merging two strings in the above examples. For example, it may be desirable to require an overlap of at least two characters prior to merging two strings. In attempting to merge two strings, it may also be desirable to confirm that the resulting string or block would have valid characteristics (such as valid location of feature characters, correct number of characters between feature characters, valid parity pattern(s), verified checksum digits, and other forms of legal character pattern, if any, required by the application) prior to merging or storing the strings. Such parameter information (i.e., minimum overlap and valid characteristics) may be stored for various label formats so that potential strings or blocks may be compared thereto to verify validity. Furthermore, the parameters stored in the scanner may be programmable so that they can be readily modified for differing applications or conditions. For example, the scanner may be configurable by a host computer in a POS system or by reading and storing control information from a separate calibration label. Exemplary methods whereby these control parameters may be programmed into the scanner are described in U.S. Pat. Nos. 4,861,972 and 4,866,257, Elliott et al, issued Aug. 29, 1989 and Sep. 12, 1989, respectively, both of which are hereby fully incorporated by reference herein.

If strings cannot be merged into complete segments, blocks, or labels in the above fashion, because, for example, there is no identity of end characters, a block processing routine 140 (also within the processing component 89) attempts to merge strings which may have inaccurate leading or trailing characters (e.g., due to various causes such as folds, tears, or splits in the bar code label, mis-framing of the label or degradation of the input data along a diagonal scan path).

In this regard, the block processing routine 140 checks for common data sub-strings that may be intermediate to one or both of the strings being processed and, if found, attempts to merge the strings on the assumption that the end data adjacent to the common sub-string but on opposite ends within each string may be inaccurate. This is accomplished by systematically "trimming," i.e., deleting, suppressing, or otherwise ignoring, characters which are adjacent to the common element or sub-string and combining the resulting intermediate strings to form processed strings which are tested for valid segment structures.

FIGS. 3(*a*), 3(*b*), and 3(*c*) illustrate, by way of example, stitching methods for use in these situations. In the example depicted in FIGS. 3(*a*) and 3(*b*), it is assumed that strings abc and dbg have been formed from partial scans of an optical code wherein a, b, c, d, and g represent sub-strings of, e.g., data characters. The block processing routine 140 identifies b as a common sub-string to both strings and creates two sets of intermediate strings by systematically trimming the ending data adjacent to b.

As depicted in FIG. 3(*a*), one set of intermediate strings is formed by trimming the data adjacent to the common sub-string on the right end of the string abc and on the opposing, i.e., left end of string dbg. In this manner the intermediate strings ab and bg, respectively, are formed. These intermediate strings are then combined by deleting the redundant b string and maintaining the other characters in proper positional relationship to form the processed string abg. This resulting processed string may then be verified for valid structure (as previously described, for example) and, upon verification, stored in an appropriate location (depending on whether a partial segment, complete block, or label results).

A second set of intermediate strings is formed by trimming the data adjacent to the common sub-string on the other ends of strings abc and dbg, as depicted in FIG. 3(*b*), resulting in the intermediate strings bc and db, respectively. These intermediate strings are then combined, again by deleting the redundant b string and maintaining the remaining characters in proper positional relationship, to form the processed string dbc which may likewise be verified and stored as described above.

As with the previously discussed case of end character overlap, if validity of one of the processed strings is confirmed, such as by parity information, checksum calculations, or other label characteristics, the new string is either further processed with existing strings or stored (in a block storage buffer 150). Invalid strings are discarded.

It will be appreciated that the above stitching method will reject leading or trailing data that appears as a valid character but, when compared against the internal data of a different string or other label criteria, is assumed to be inaccurate because of a misreading at the beginning or end of the scan, respectively. In addition, it should be readily apparent that simpler applications of the stitching method may be implemented by the processing component 89. For example, the block processing routine 140 may just as easily be applied to strings ab and dbg to test the combination of abg despite the fact that the first string has no misread or otherwise inaccurate data to be rejected.

An alternative or concurrent embodiment of the invention, accomplishing a similar, "marginless" stitching task operates by pivoting the composition of the new string around a center feature character as described with reference to the following example. FIG. 3(*c*) depicts a simplified representation of a UPC label 300 having left and right guard characters 302, G, a center character 304, C, and data characters 306. First and second scan lines 310 and 320, respectively, represent possible read paths of the scanner across the label such that a complete read of a valid end character is not obtained at an end of the scan lines.

The system 5 decodes the scan lines, 310 and 320, respectively, into the data strings:

String 1: G u x C y v
String 2: s x C y t G

In this representation, the symbols t, u, x and y represent accurate label data, which may comprise single characters or character segments. Symbols v and s represent misread or otherwise inaccurate data interpreted as valid from the partial read of characters t and u, respectively. It will be noted that, in this example, the character pattern xCy is a common sub-string to both strings.

The block processing routine 140 attempts to make a single valid string by deleting characters from one end of one string and the opposite end of the other string (e.g., the right end and the left end of strings 1 and 2, respectively) up to the point of the common character pattern and combining the resulting intermediate strings. The block processing routine 140 may also check the alternate combination formed by deleting characters from the other opposing ends of each of the strings being processed and, again, combining the resulting intermediate strings into a processed string.

Thus, in the example above, as depicted in FIG. 3(*c*), the string processing routine 120 forms the intermediate and processed strings as follows:

Intermediate string 1: G u x C y (from string 1)
Intermediate string 2: x C y t G (from string 2)
Yields processed string 2: G u x C y t G
and
Intermediate string 3: x C y v (from string 1)
Intermediate string 4: s x C y (from string 2)
Yields processed string 3: s x C y v The block processing routine 140 examines the structural validity of the resulting processed strings using parity, check-sums, and other label criteria (e.g., number of characters expected) as appropriate. Invalid strings are discarded while valid strings are confirmed and either further merged with other strings by the block processing routine 140 (i.e., unless no additional existing strings remain that may be merged with the valid string), stored in the block storage buffer 150, or otherwise prepared for further processing by block processing routine 140 (e.g., if a complete segment, block, or label is formed) as described herein. As can be seen above, processed string 2 contains the desired label with the inaccurate or misread data (v and s) having been discarded. Upon confirmation of validity, the block processing routine 140 prepares this resulting string (i.e., validated processed string 2) for further processing as further described herein.

As applied in a preferred embodiment of the present invention, microfiche appendix B sets forth actual source code, i.e., software listings, which may be used to implement the above described string and block processing routines. It should be noted, however, that the order of the processing steps presented, and the grouping of these steps into separate routines, may be modified without departing from the scope of the present invention. Likewise, while the above system utilizes a single processing component 89 to perform the interrupt routine and the string and block processing routines, multiple processors may be readily utilized for these functions.

In order to increase confidence that only inaccurate data is discarded, there may be some minimum requirement of character overlap (e.g., in the b sub-string of FIGS. 3(*a*) and 3(*b*), or the xCy sub-string of FIG. 3(*c*)) prior to merging two strings. For example, an overlap of three characters may be required when some data must be discarded to merge strings. It will be appreciated, however, that no surrounding margin or white space on the label is needed to successfully merge two strings in accordance with the methods of the present invention.

Where label segments comprising N characters (e.g., N characters between a guard character and a center character) are to be decoded, the method of FIGS. 3(*a*)–(*c*) may be employed to successfully stitch a partial segment comprising a feature character and less than N/2+1 data characters with a partial segment of longer length. In addition, this latter method does not require assembly of partially read segments into label halves before complete labels may be processed in multi-segmented label formats; complete labels may be formed directly from the partially read segments.

Since a store of partially read segments is accumulated as strings are read in from storage area 95 and processed by string processing routine 120, it may be desirable for speed and efficiency purposes to initially attempt to merge the most recently read or processed (i.e., most recently stored) existing string in the buffer 130 with any new string read or any newly processed string from the storage area 95. Further merge attempts, if necessary, proceed from the next most recently stored to the least recently stored existing string in the buffer 130. Any new partial string (unprocessed or processed) that remains unmerged is added to the string storage buffer 130. If the string storage buffer 130 is full, the least recently used string may be discarded.

When a complete block is detected and validated (e.g., by parity check, check-sum digit calculation, or other well known means) by string processing routine 120, it may be passed to a block storage buffer 150 and the associated strings are deleted from the string storage buffer 130 to make room for additional strings. After string processing is complete, block processing routine 140 processes the blocks in the block storage buffer 150 to determine if a multiple-block label exists and to assemble it if it does. If a single block label is detected, the label is read and processing concludes as described further herein.

Like the string processing routine 120, while it is preferable that the block processing routine 140 be accomplished with software, it may readily be implemented either fully or partially in hardware. The block processing routine 140 checks for the existence of sufficient valid blocks of appropriate structures to form a complete label (e.g., based on stored label criteria as noted previously). Such blocks may, for example, comprise single blocks or sub-blocks of multi-block labels. The blocks may, for example, be of the type typically referred to as "D" or "n(3)" blocks as found in Blk-1, Blk-6 and Blk-7 code formats known to the art. If a block used in a multiple-block format is detected, the block processing routine 140 will identify any corresponding block(s) and combine them into a complete label. The complete label information may then be made available as output for further processing or display according to the application. Upon reading, identifying and validating a label, it is also desirable to clear the string buffer 130 and the block buffer 150 in preparation for the next label read.

While not essential, it may be desirable in the case of some label formats with higher potential error rates (such as UPC-E labels) to require a minimum number of observations of a block prior to acceptance and combination with other blocks to form a label. For example, block processing routine 140 may require that a particular block have been detected twice before it will be used to assemble label data. Such a requirement may improve, i.e., decrease, the mis-read rate. The required minimum, if any, may be chosen in accordance with an agreed trade-off between higher performance and lower mis-read rate based on particular applications. In addition, such observation value may be included as one of the configurable scanner parameters previously described herein.

A more detailed description of a preferred string and block processing operation will now be described with reference to the flow diagrams of FIGS. 4 through 13. Further details of the operation of these routines are contained in microfiche appendix B which sets forth actual source code listings used to implement them on a Motorola 68HC11 processor.

Figure 4:
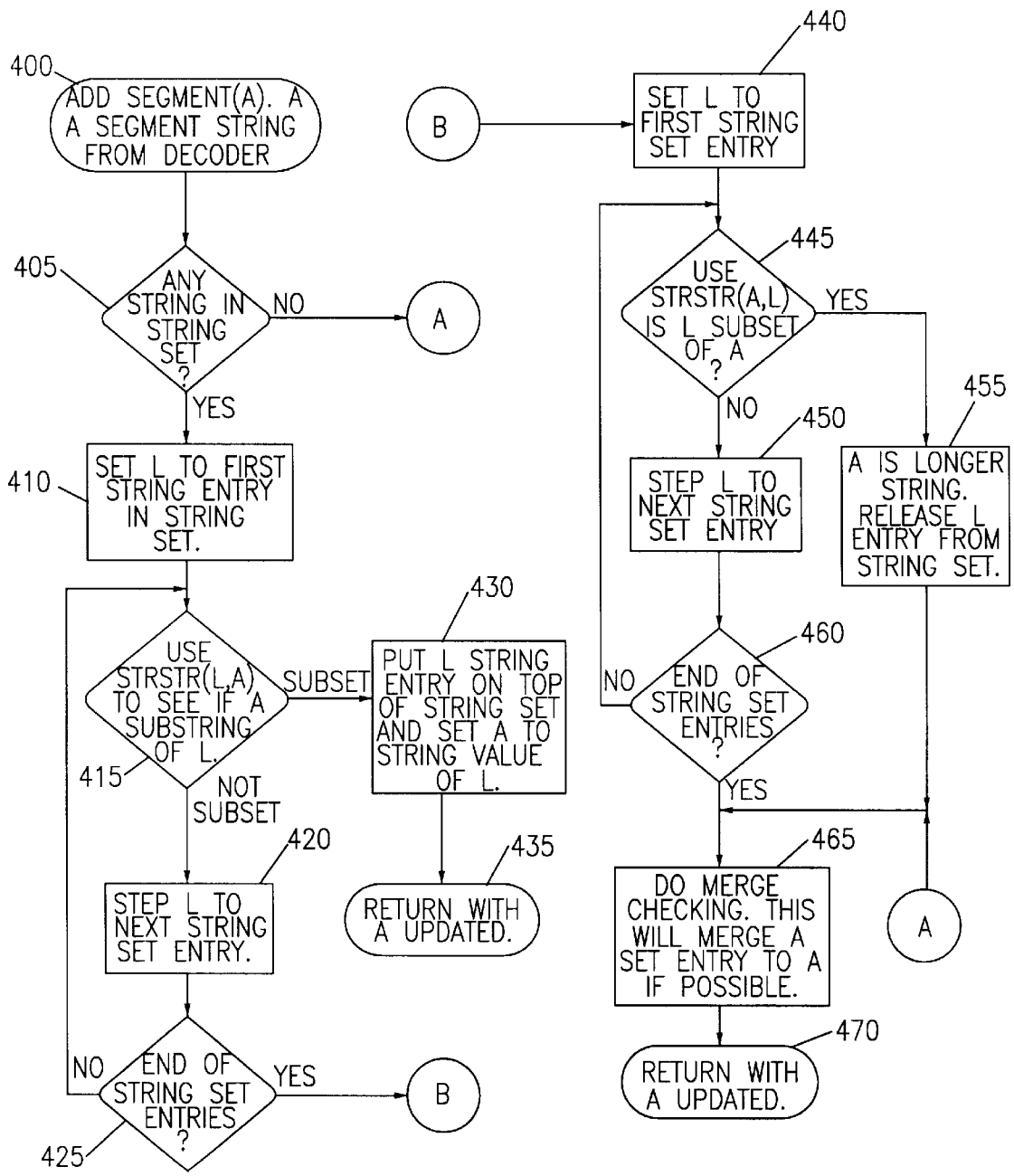
FIG. 4 is a flow diagram illustrating that portion of the string processing routine which eliminates redundant substrings.

FIG. 4 shows the initial processing of a string segment from the decoder (step 400). As noted previously, the string may be selected from either the long piece queue 100 or the short piece queue 110 (reference FIG. 1), or presented directly from the decoder if the processing component 89 is capable of operating at a fast enough speed. Access to the string segment (denoted "A" in the flow diagram) may be directly from memory storage, utilizing a pointer, or, the string segment may be placed in a separate register for processing.

A check is made (step 405) to determine whether there are any existing strings found in the string set (i.e., the string storage buffer 130 (as shown in FIG. 1). If no existing strings are found, as would be the case for initial processing on a particular label, a merge checking operation is performed (step 465) as further described with reference to FIG. 5 below. Since no existing strings are available for merger with string "A" in this instance, this routine will result in the placement of string "A" into the string storage buffer 130.

If existing strings are found in the string set, then each existing string is compared with string "A" to determine if "A" is a sub-string of any existing string. To accomplish this, a pointer "L" references the first string entry in the string storage buffer 130 (step 410). A sub-string check operation (denoted STRSTR and referenced in FIG. 6 to be further described below) is utilized to determine if string "A" is a sub-string of the string referenced by pointer "L" (step 415).

If it is determined that string "A" is not a subset of the existing referenced string entry then "L" is updated to reference the next string entry in the string storage buffer 130 (step 420). A determination is then made as to whether the end of the string entries has been reached in the string storage buffer (step 425), and, if not, the sub-string matching operation is repeated as above (steps 415, 420, and 425) until the end of the string entries has been reached or it is determined that string "A" is a subset of an existing string at step 415.

If, at any point, string "A" is found to be a sub-string of an existing string (step 415), then the string entry referenced by "L", which is found to contain the "A" sub-string, is placed on top of the string set (i.e., is made the first entry in the string storage buffer 130) and string "A" is replaced with the value of that string entry referenced by "L" (step 430). Processing is then continued with string "A" updated (step 435).

If the end of the entries in the string storage buffer 130 is reached without a determination that string "A" is a substring of any of the existing strings (step 425), the system then checks to determine if any existing string is a subset of string "A". To accomplish this, pointer "L" is set to the first entry in the string storage buffer 130 (step 440). The sub-string checking operation (STRSTR) is then performed to determine if the existing string referenced by "L" is a subset of string "A" (step 445). If not, "L" is updated to reference the next string entry (step 450) and a determination is made whether the end of the string set entries has been reached (step 460). If not, the sub-string checking operation is performed again on this new pair of strings (step 445). This process continues until all existing strings have been compared with string "A".

If the sub-string checking operation determines that an existing string referenced by "L" is a subset of string "A" (step 445), then the string referenced by "L" is deleted from the existing string set, i.e., string storage buffer 130 (step 455). Once this processing is completed, a merge checking operation is performed to attempt to merge an existing string in the string set with string "A", if possible (step 465), as further described with reference to FIG. 5 below. Upon completion string "A" is available for further processing (step 470) as described below with reference to FIG. 8.

Figure 5:
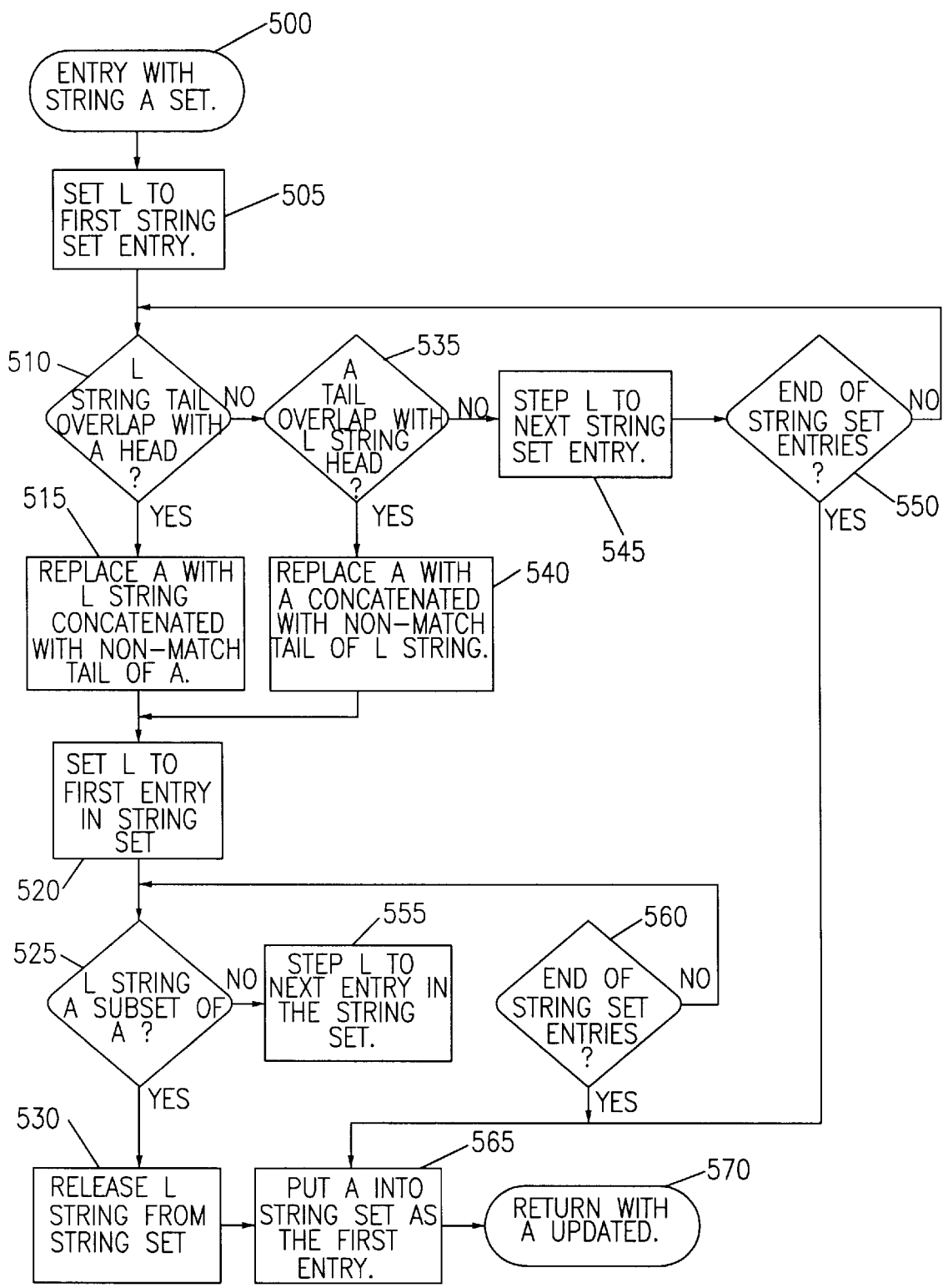
FIG. 5 is a flow diagram illustrating that portion of the string processing routine which merges two strings having overlap at their opposing ends.

FIG. 5 describes in detail the merging operation which determines whether string "A" may be combined with an existing string in the string storage buffer 130, based on matching data at opposing ends of string "A" and an existing string. Processing begins (step 500) with string "A" having been initially processed (through step 465 of FIG. 4). Pointer "L" is set to reference the first entry in string storage buffer 130 (step 505). A first check is then made to determine whether the trailing characters (i.e., tail) of the string entry referenced by "L" overlap with the leading (i.e., head) characters of string "A" (step 510). If not, a second check is made to determine whether the trailing characters of string "A" overlap with leading characters of the existing string referenced by "L" (step 535). If this determination results in a finding of no overlap, then pointer "L" is updated to reference the next existing string in the string storage buffer (step 545) and a determination is made as to whether the end of the string entries has been reached (step 550).

If the end of the string entries has not been reached, then this next existing string, referenced by "L", is similarly checked for overlap (steps 510 and 535). This process continues until the end of the string entries has been reached, or an overlap condition is found to exist at step 510 or 535. If the trailing end of the string entry referenced by "L" is found to overlap with the leading end of string "A" (step 510), then string "A" is replaced with a new string formed by concatenating the existing string with the non-matching trailing end of string "A" (step 515). Likewise, if the trailing end of string "A" is found to overlap with the leading end of the existing string (step 535), then string "A" is replaced with a new string formed by concatenating string "A" with the non-matching trailing end of the existing string (step 540).

"L" is then updated to again point to the first entry in the string storage buffer 130 (step 520) so that this "new" string "A" may be compared with existing string entries to determine if any existing strings are subsets of the "new" string "A" (step 535). As previously described with reference to FIG. 4, such check is made with respect to each entry in the string storage buffer until all entries in the string set have been checked (steps 555 and 560). Any existing strings in the string storage buffer 130 which are found to be subsets of string "A" are deleted from the string set (step 530).

If the end of the string entries in the string storage buffer are reached without merging (step 550), or, if after merging two strings and comparing the "new" string "A" with the existing strings to check for redundant sub-strings, the end of the string entries are reached without finding a subset (step 560), or, after deleting any existing strings which are subsets of the "new" string "A" (step 530), then string "A" is placed in the string storage buffer 130 as the first entry in the buffer (step 565). String "A" then remains available for further processing as described below (step 570).

Figure 6:
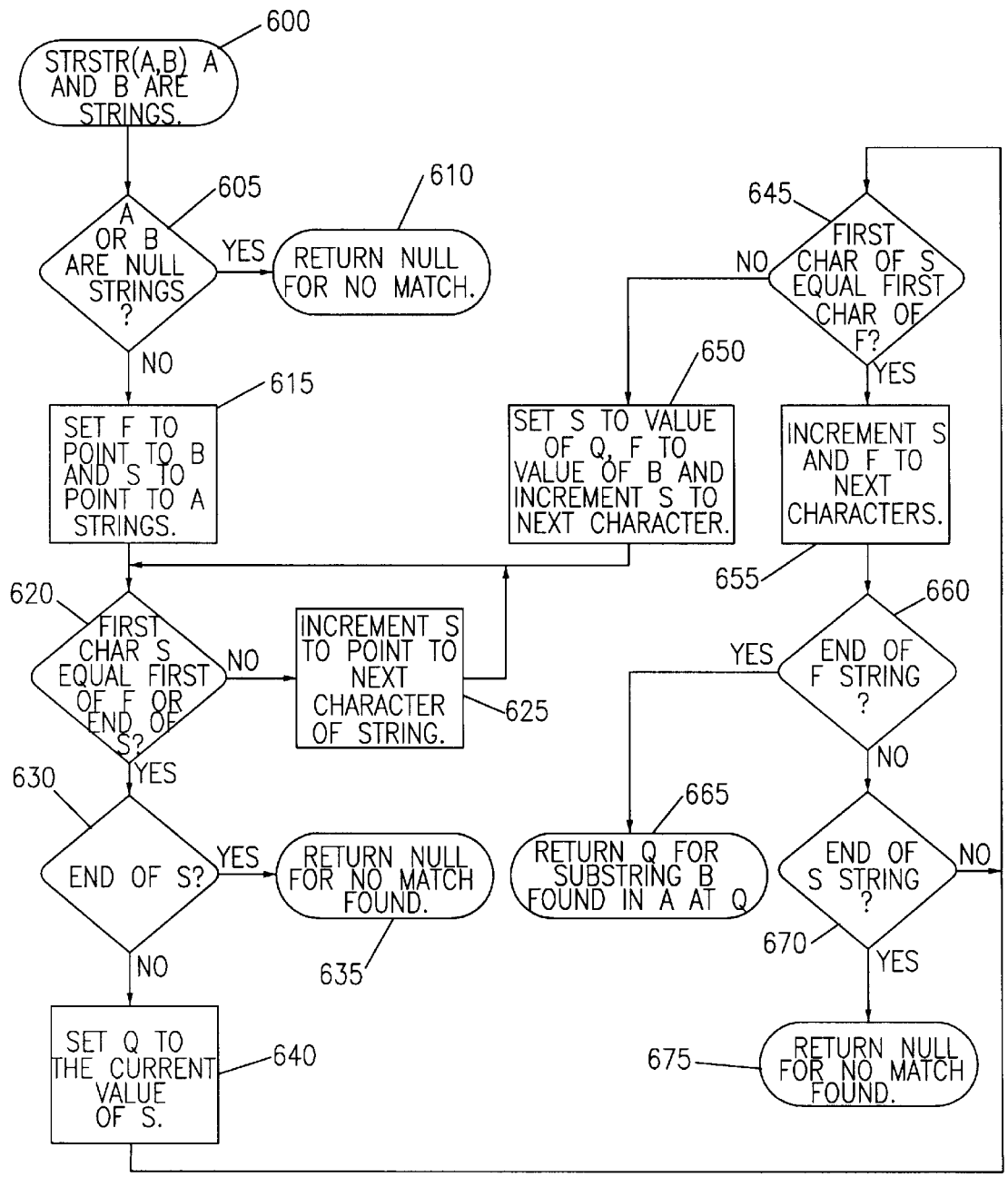
FIG. 6 is a flow diagram illustrating that portion of the string processing routine which checks for redundant substrings to be eliminated.
Figure 7:
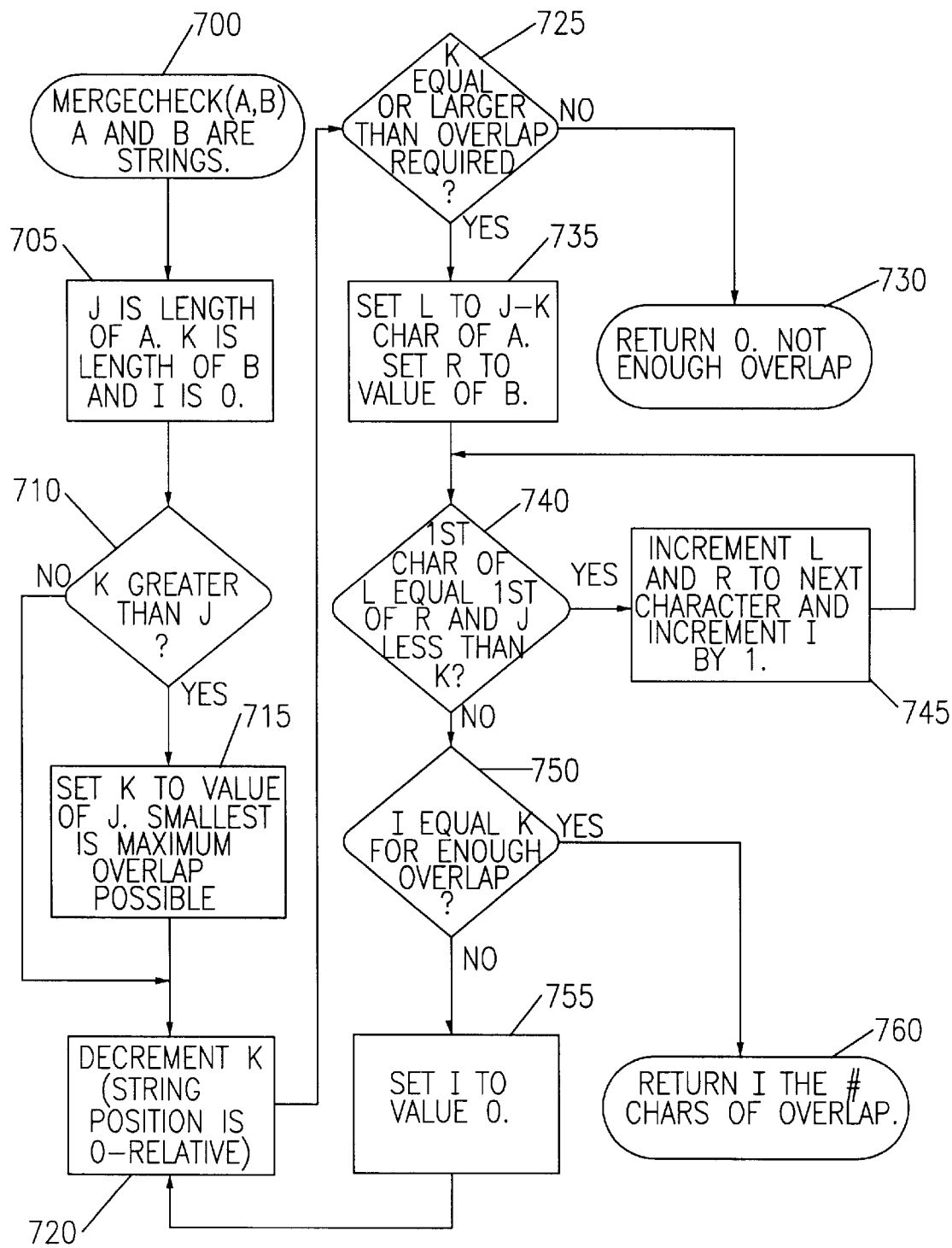
FIG. 7 is a flow diagram illustrating that portion of the string processing routine which determines if a sufficient number of characters overlap to confidently merge two strings.

FIG. 6 describes in detail the sub-string matching operation used to determine if one string is a subset of another string. This procedure operates on two strings "A" (not necessarily the same as string "A" above) and "B" (step 600) where, for example, "A" may be an existing string in string storage buffer 130 and "B" may be a new string to be processed. In this operation, the characters within "A" and "B" are systematically probed to check for match conditions indicating that the "B" string is a subset of the "A" string. Strings "A" and "B" are first checked to determine if either are null strings (step 605), i.e., contain no string data. If either string "A" or string "B" is a null string, then the sub-routine is exited with respect to these two strings as no match will be found (step 610).

If neither string "A" nor string "B" are null strings, then pointers "F" and "S" are utilized to reference individual characters within strings "B" and "A", respectively, beginning with the 1st character of each string. Thus, pointer "F" is placed at the first character of string "B" and pointer "S" is placed at the first character of string "A" (step 615). A check is made to determine if the first character of "S" equals the first character of "F", or whether the end of the "S" string referenced has been reached (step 620). If no match is found between these two characters then "S" is incremented to point to the next character of the string (step 625) and a check is again made to determine whether this "S" character is equal to the first character of "F", or whether the end of the string referenced by "S" has been reached. This process continues if no match is found (i.e., "S" is incremented to point to the 3rd character, then the 4th, etc.) until a match is found between the first character of "F" and a character within "S", or the end of "S" is reached.

If the end of the "S" string is reached without finding a match between "S" and "F" (step 630), the routine is exited due to no match being found (step 635). If a match in characters between "S" and "F" is established prior to reaching the end of "S", then the current value of "S" is stored as Q (e.g., in a separate register defined for this purpose) (step 640), thus signifying the position of the matching character. Any additional characters within the "F" referenced string are then checked to verify that the entire "F" referenced string is a subset of the "S" referenced string.

Upon finding a match between the first character of "F" and a character within "S", both "S" and "F" are incremented to reference their respective next characters (step 655). A check is then made to determine if the end of the "F" referenced string has been reached (step 660). If it has not, then a check will be made to determine whether the end of the "S" referenced string has been reached (step 670). If the end of the "S" referenced string has been reached before the end of the "F" referenced string has been reached, then this routine will be exited as to these two strings as no match has been found (step 675).

If neither the end of the "F" string nor the end of the "S" string has been reached after advancing both "F" and "S" to the next characters, then a check is made to determine if the new first character of "S" is equal to the new first character of "F" (step 645), indicating the match of an additional character in each sequence. "S" and "F" are then incremented again to point to their respective next characters and the above steps (645, 655, 660, and 670) are repeated to determine if the ends of either string has been reached, or if there is a match in the characters. This process continues until the end of a string has been reached or until it is determined that there is no match between a character of "S" and a character of "F".

If a subsequent character of "S" and "F" are found to be different (step 645), then "F" is returned to the beginning of string "B", "S" is returned to the value stored as "Q", and then "S" is incremented to the next character (step 650) in order to determine if string "B" is a subset of any subsequent portion of string "A". The process then repeats (beginning at step 620), with the updated "S" and "F" values, as described above.

If, after at least one matching character is found, the end of the "F" referenced string is reached (step 660), then the subroutine is exited having determined that sub-string "B" is found in string "A" (step 665) beginning at a location defined by the value stored in register "Q".

As noted previously, it may be desirable to require a minimum overlap of characters prior to merging two strings. The flow diagram of FIG. 7 describes in detail an overlap checking operation which may be utilized to determine the amount of overlap between two strings (denoted "A" and "B"), and to verify that such overlap complies with minimum requirements. The operation proceeds as follows. Two strings which are to be merged (as a result, for example, of finding overlap in the merge checking operation of FIG. 5) are identified as "A" and "B" (step 700) by, for example, placing them into registers or addressing their locations with pointers. Next, variables "j", "k", and "i" (which may be registers, counters, or the like) are set to the length of "A", the length of "B", and 0, respectively (step 705).

Since the length of the shortest string represents the maximum overlap possible between the two strings, the value of "k" is compared with the value of "j" to determine which is greater (step 710). If "k" is greater than "j", then the value of "k" is changed to the smaller value of "j" (step 715). If "k" is not greater than "j" it is left unchanged. The resulting "k" value is then decremented by one so that the string position is 0-relative (step 720). A check is then made to verify that the resulting "k" value is equal to or larger than the minimum overlap required (step 725). If "k" is less than the minimum overlap value then there cannot be enough overlap regardless of the number of characters which match within "A" and "B". Thus the routine is exited (step 730) and a 0 value is returned indicating insufficient overlap (and, thus, merger of the two strings would not be completed).

If "k" is equal to or greater than the minimum overlap required then the actual number of overlapping characters must be determined and compared to the requirement. To accomplish this, a pointer "L" is placed so as to reference the "j–k"th character of string "A", while a pointer "R" is placed at the first character of string "B" (step 735). A check is made to determine whether the characters referenced by "i" and "R" are equal, and whether the value of "i" is less than the value of "k" (step 740). If yes, then "L" and "R" are moved to the next characters in their respective strings and "i" is incremented by one (step 745).

The above steps (740 and 745) are repeated until a character match is not found, or until the value of "i" equals "k". If this latter condition is found (step 750), then the actual number of overlapping characters is sufficient and the routine is exited (step 760) returning "i" as the number of characters of overlap actually found. If non-matching characters are detected prior to "i" equalling "k" (steps 740 and 750) then it must still be determined whether the actual overlap is sufficient. To do so, "i" is reset to 0 (step 755), "k" is decremented by one again, (step 720) and the subsequent process is repeated with this new value of "k".

Figure 8:
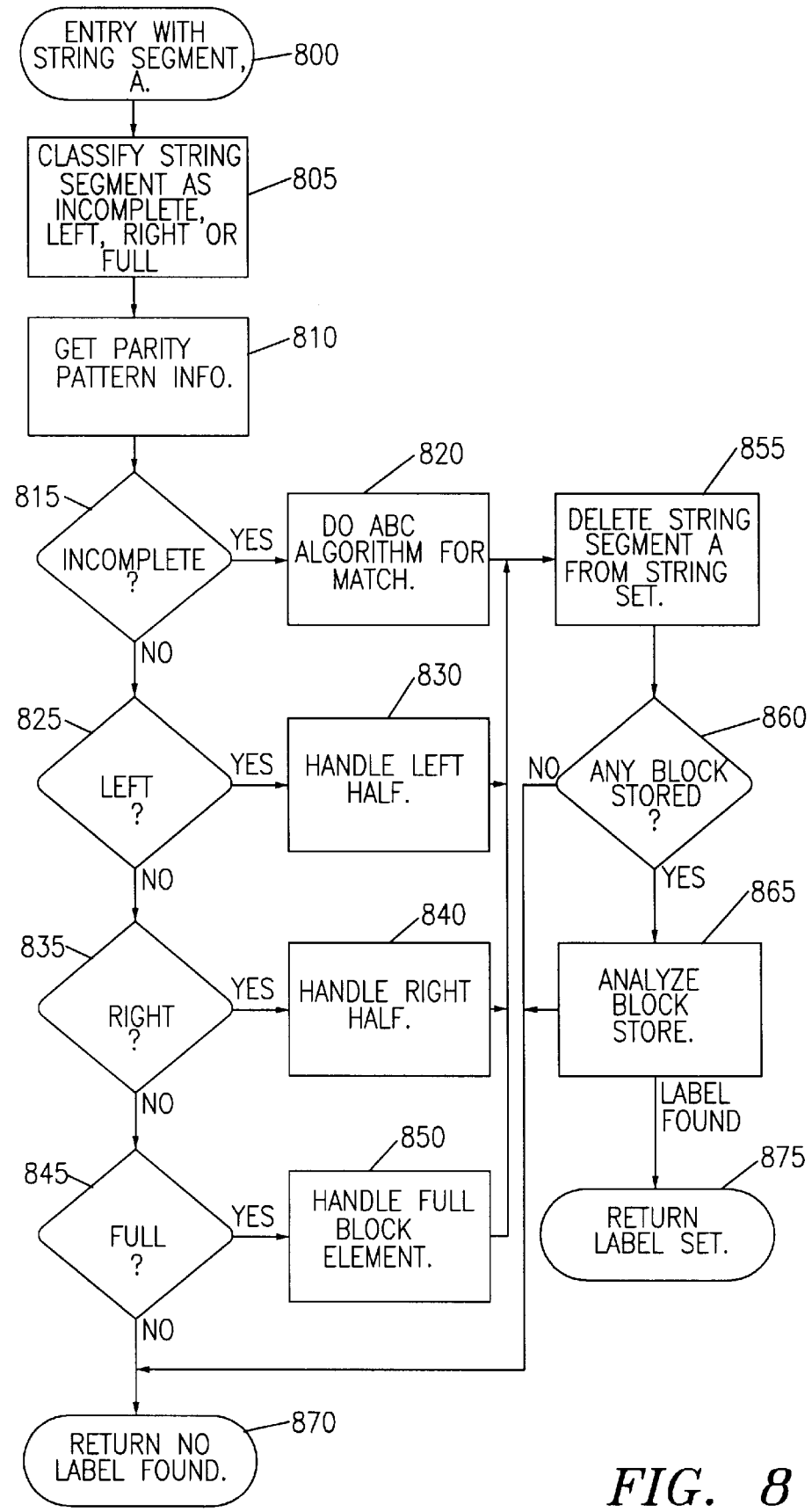
FIG. 8 is a flow diagram illustrating that portion of the block processing routine which merges two strings having overlapping characters intermediate to at least one of the strings, and controls further processing of block segments.

The flow diagram of FIG. 8 describes in greater detail the operations of merging strings which may have inaccurate data at an end and of processing string segments into blocks and labels. This section of the system operates on a string (denoted "A") which has undergone processing as described above with reference to FIGS. 4–7. Upon presentation to this processing section (step 800), string "A" is classified as being an incomplete segment, a left half segment, a right half segment, or a full block element based upon the presence of feature characters and other label characteristics known in the art (step 805). Parity pattern information is then obtained (step 810) for use in determining label type and verifying label validity.

Figure 9:
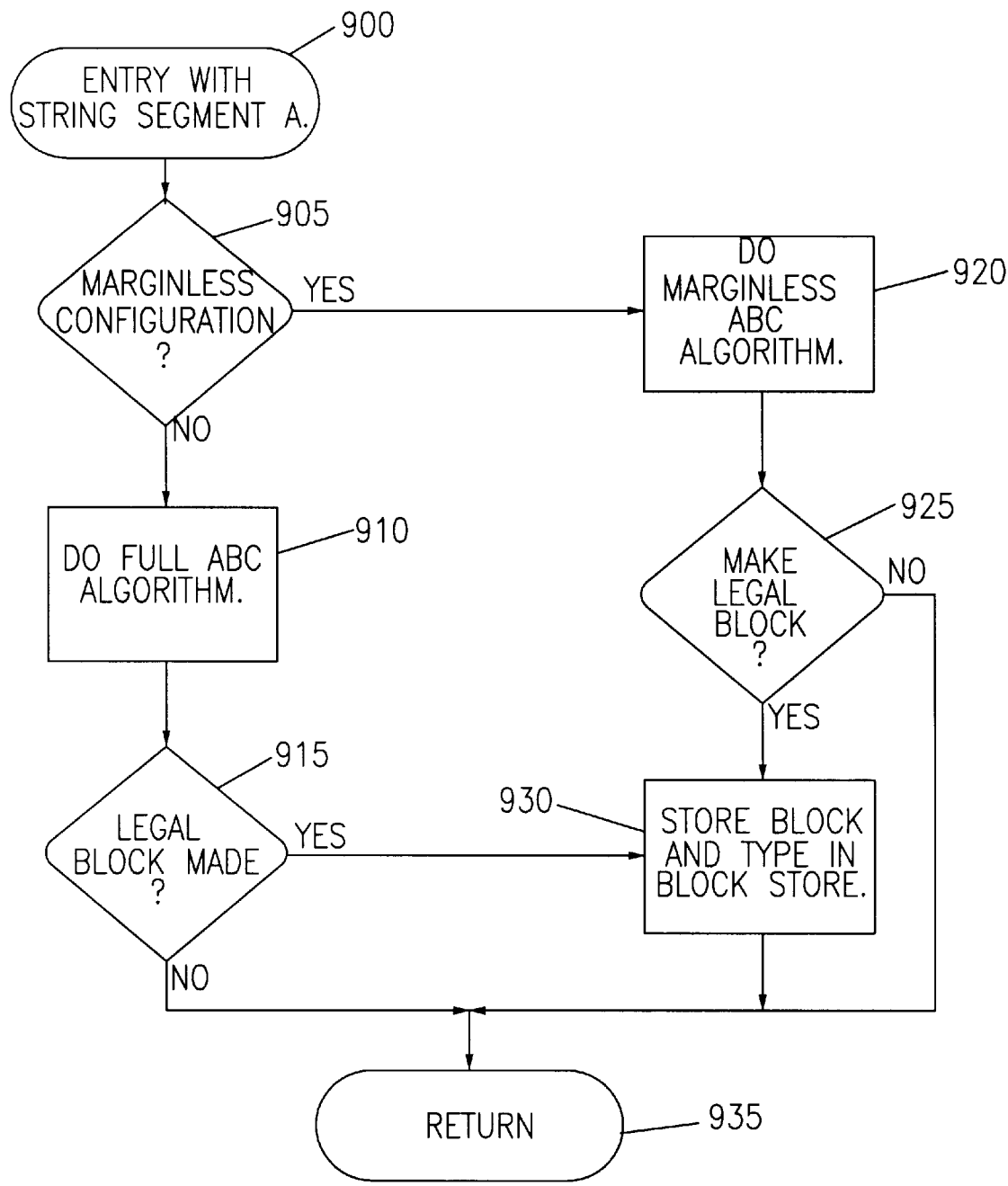
FIG. 9 is a flow diagram illustrating the "ABC" merging routine of the present invention.

If string segment "A" is an incomplete segment (step 815) then the system attempts to merge this segment with other stored string segments using the "ABC" merge technique of the present invention (step 820), as previously detailed by way of examples and further described with reference to FIG. 9 below.

If string "A" comprises a left-half segment (step 825), a routine for handling and storing left-half segments is implemented (step 830), as further described with reference to FIG. 10 below.

If string "A" comprises a right-half segment (step 835), a routine for handling and storing right-half segments is implemented (step 840), as further described with reference to FIG. 11 below.

If string "A" comprises a full block element (step 845), a routine for handling and storing full block elements is implemented (step 850), as further described with reference to FIG. 12 below.

If string "A" is not any of the above (i.e., incomplete segment, left-half, right-half, or full block element), the routine is exited as to that string since no label may be formed therewith (step 870).

Upon the completion of an applicable separate handling routine (step 820, 830, 840, or 850), string segment "A" is deleted from the string set (step 855) and a check is made to determine whether any block has been stored as a result of the handling routine (step 860). If no block has been stored, the routine is exited as to that string since no label may be formed subsequently (step 870). If a block has been stored as a result of the above processing, a block store analysis routine is implemented (step 865) to determine if a label may be formed, as further described with reference to FIG. 13 below. If, as a result of the block store analysis, no label may be formed, the routine is exited as to that string (step 870). However, if a valid label may be formed from the blocks stored, the routine is completed and a label found indicator is set (step 875).

As noted above, if string "A" comprises an incomplete string segment, the "ABC" merge technique of the present invention is utilized to attempt to merge this string with other existing strings in order to form a longer string segment, or possibly a complete block or label (step 820). As described in FIG. 9, incomplete string segment "A" is presented for processing (step 900). A check is then made to determine whether a "marginless" or a "full" stitching decoder has been utilized to obtain decoded string information (step 905). It should be noted that the use of the term "marginless" with respect to one possible processing implementation does not imply that other implementations require the presence of margin information. None of the merge routines of the present invention require a margin to be present in order to merge two strings, rather they are all indifferent as to whether margin information is present or not.

If it is determined that a "marginless" configuration has not been utilized (i.e., two decoders, one forward and one backward have decoded strings containing at least one feature character and three data characters), then a "full ABC" merge is performed (step 910). If a "marginless" configuration has been utilized (i.e., a marginless decoder having decoded strings containing at least two feature characters, for example, one guard and one center character), a "marginless ABC" merge is performed (step 920), as described previously with reference to FIG. 3 (c). In both cases, data at the ends of the strings are systematically deleted (as previously described) and the resulting intermediate strings are checked to determine if merger into a valid segment is possible (utilizing a method similar to that described with reference to FIG. 5).

Upon completion of either the "full" or the "marginless" "ABC" merge technique, a check is made to determine whether a legal block has been formed (step 915 or step 925, respectively) based on comparison with known block criteria, such as, parity, feature character location, and other characteristics known to the art (these criteria may be programmed into look-up tables or may be configurable by a central system associated with the particular application, as previously described).

If a legal block is formed, the block itself, and the type of block, are stored for further processing into labels (step 930). The routine is then exited (step 935). If no legal block is formed (step 915 or step 925), the routine is exited without storing block information (step 935).

Figures 10, 11:
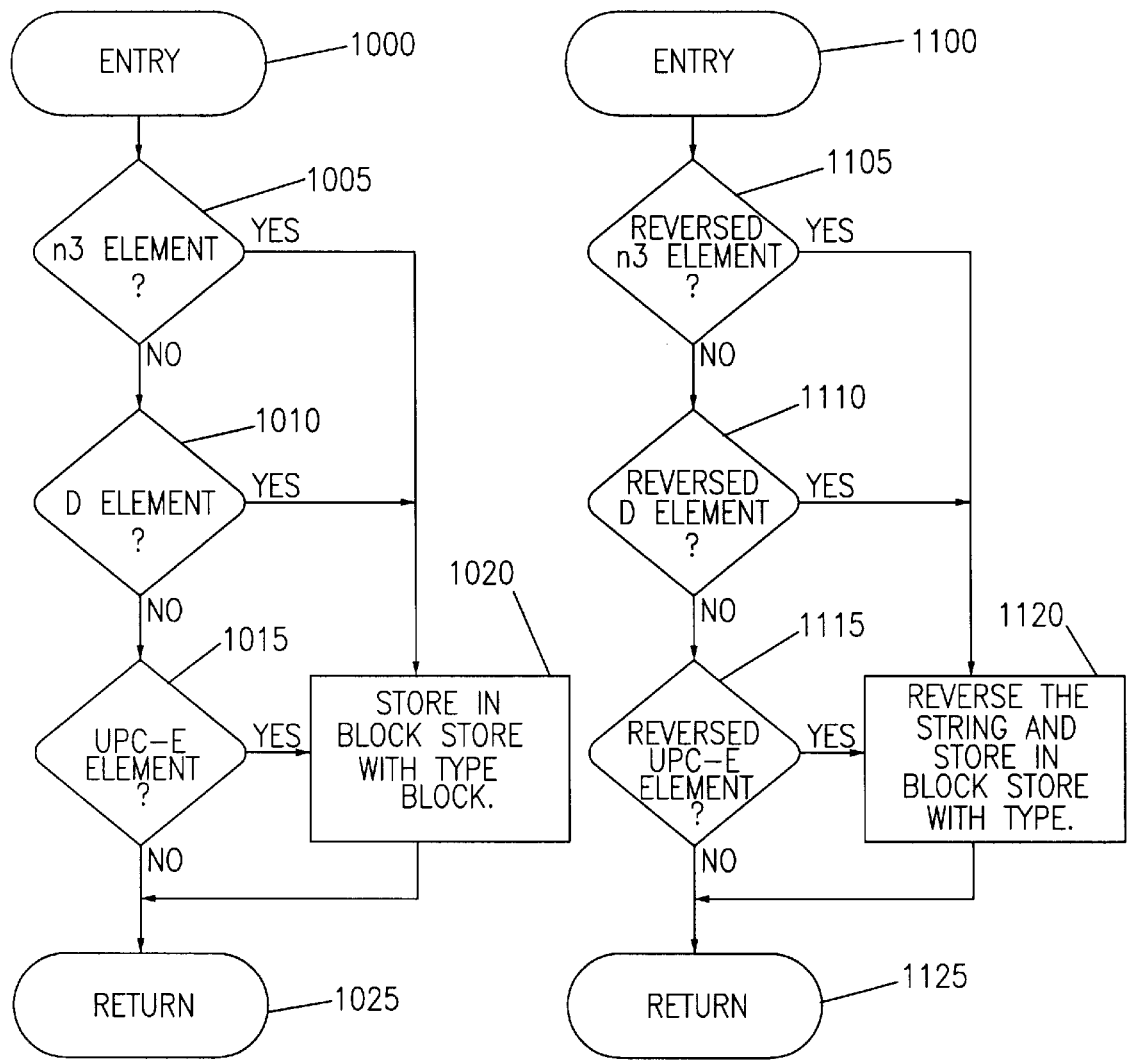
FIG. 10 is a flow diagram illustrating that portion of the block processing routine which handles left-half segments.
FIG. 11 is a flow diagram illustrating that portion of the block processing routine which handles right-half segments.

FIG. 10 describes the process utilized for handling left-half segments (reference step 830 of FIG. 8). Once a left-half segment string is provided for handling (step 1000), it is checked to determine the type of block segment (whose characteristics are known to the art) it comprises. To this end, the segment is checked to determine if it is an n3 element (step 1005), a D element (step 1010), or a UPC-E element (step 1015). If the segment is found to be any of these types, it is stored in the block storage area along with the type of block it represents (step 1020). After the segment is stored, or if it is determined that the segment does not comprise any of the above types, the routine is exited (step 1025).

FIG. 11 describes the process utilized for handling right-half segments (reference step 840 of FIG. 8). Once a right-half segment string is provided for handling (step 1100), it is checked to determine the type of block segment (whose characteristics are known to the art) it comprises. To this end, the segment is checked to determine if it is a reversed n3 element (step 1105), a reversed D element (step 1110), or a reversed UPC-E element (step 1115). If the segment is found to be any of these types, the string is reversed and it is stored in the block storage area along with the type of block it represents (step 1120). After the segment is stored, or if it is determined that the segment does not comprise any of the above types, the routine is exited (step 1125).

Figure 12:
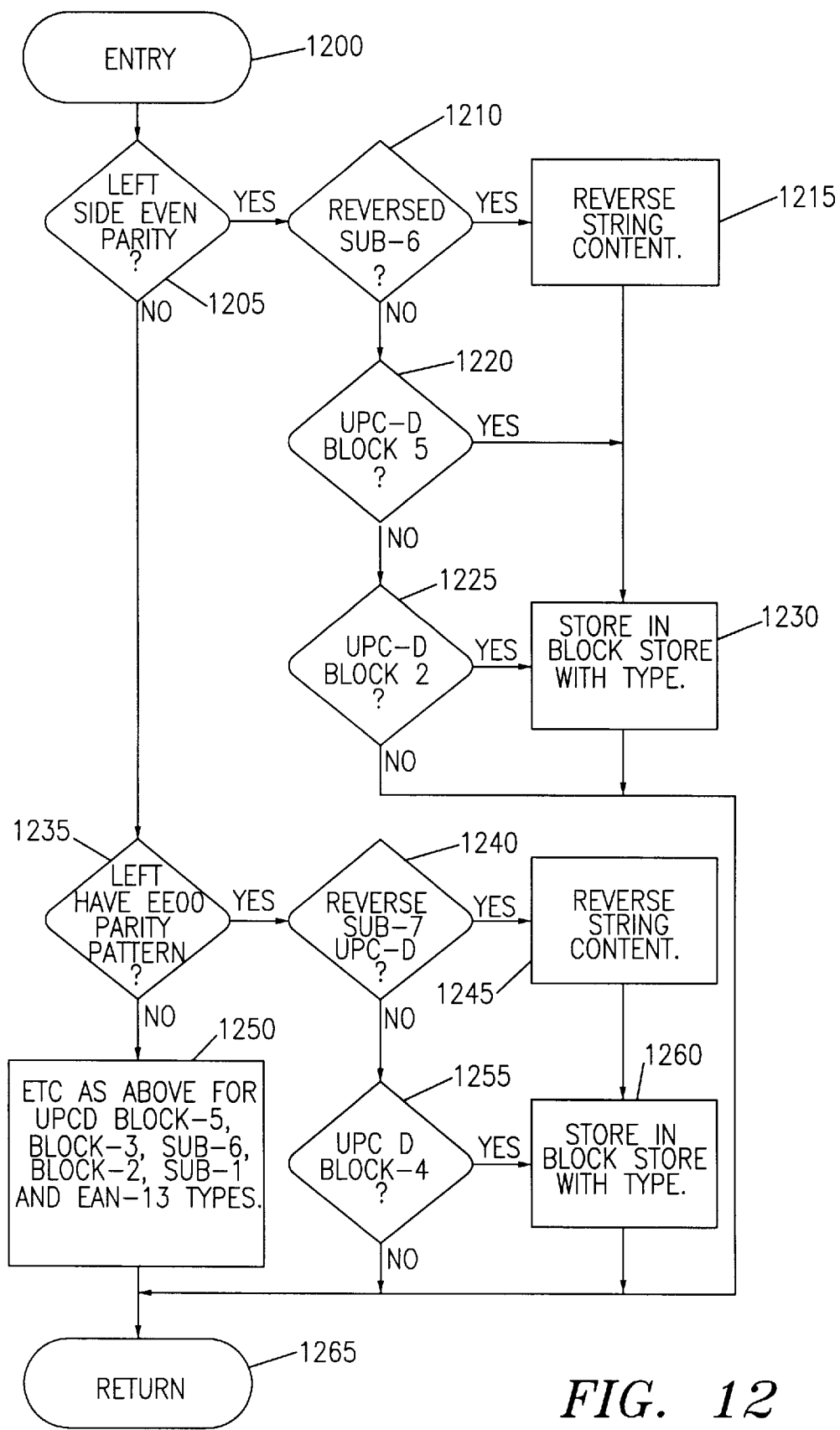
FIG. 12 is a flow diagram illustrating that portion of the block processing routine which handles full-block elements; and, FIG. 13 is a flow diagram illustrating that portion of the block processing routine which analyzes stored blocks and determines if complete label information is present.

FIG. 12 describes the process utilized for handling full-block elements (reference step 850 of FIG. 8). Once a full-block element is provided for handling (step 1200), the parity of the block segments is checked in order to determine the possible label types which the full-block element may represent (thus narrowing the number of classifications which must be analyzed). For example, the element's left side is checked to determine if it has even parity (step 1205). If so, then the element is checked to determine if it is a reversed sub-6 (step 1210), a UPC-D block 5 (step 1220), or a UPC-D block 2 (step 1225) element.

If the element is a reversed sub-6 element, the string content is reversed (step 1215) and the string is stored in block storage along with the type of block it represents (step 1230). If the element is either of the UPC-D blocks noted above, it is simply stored in the block storage along with the type of block it represents (step 1230). If the element does not represent any of these three types, the routine is exited as to that element (step 1265).

If no left side even parity exists (step 1205), an EEOO (even even odd odd) parity pattern is checked for (step 1235) which could indicate a reverse sub-7 UPC-D block or a UPC-D block 4 element. Upon finding an EEOO pattern, a reverse sub-7 UPC-D block is checked for (step 1240), and, if found, the string content is reversed (step 1245) and it is stored in block storage along with the type of block it represents (step 1260). If a reverse sub-7 UPC-D block is not found, a check is made for a UPC-D block 4 element (step 1255) which, if found, is stored in block storage along with the type of block it represents (step 1260). Once a block element has been stored, or if neither of these block types is found, the routine is exited (step 1265).

If the above parity patterns are not established, similar procedures are followed to check for the existence of other parity patterns known in the art that represent, for example, UPCD block-5, block-3, sub-6, block-2, sub-1, EAN-8, UPC-A, and EAN-13 block types (step 1250). As above, once a parity pattern identified with a group of block types is identified, individual block types are checked for, using known characteristics, and the elements are stored upon confirmation.

Once a block is stored, or an element is not found to conform to any type within the group of blocks conforming to that parity pattern, the routine is exited, as above. Likewise, if all parity pattern combinations are determined to be inapplicable the routine is exited (step 1265).

Figure 13:
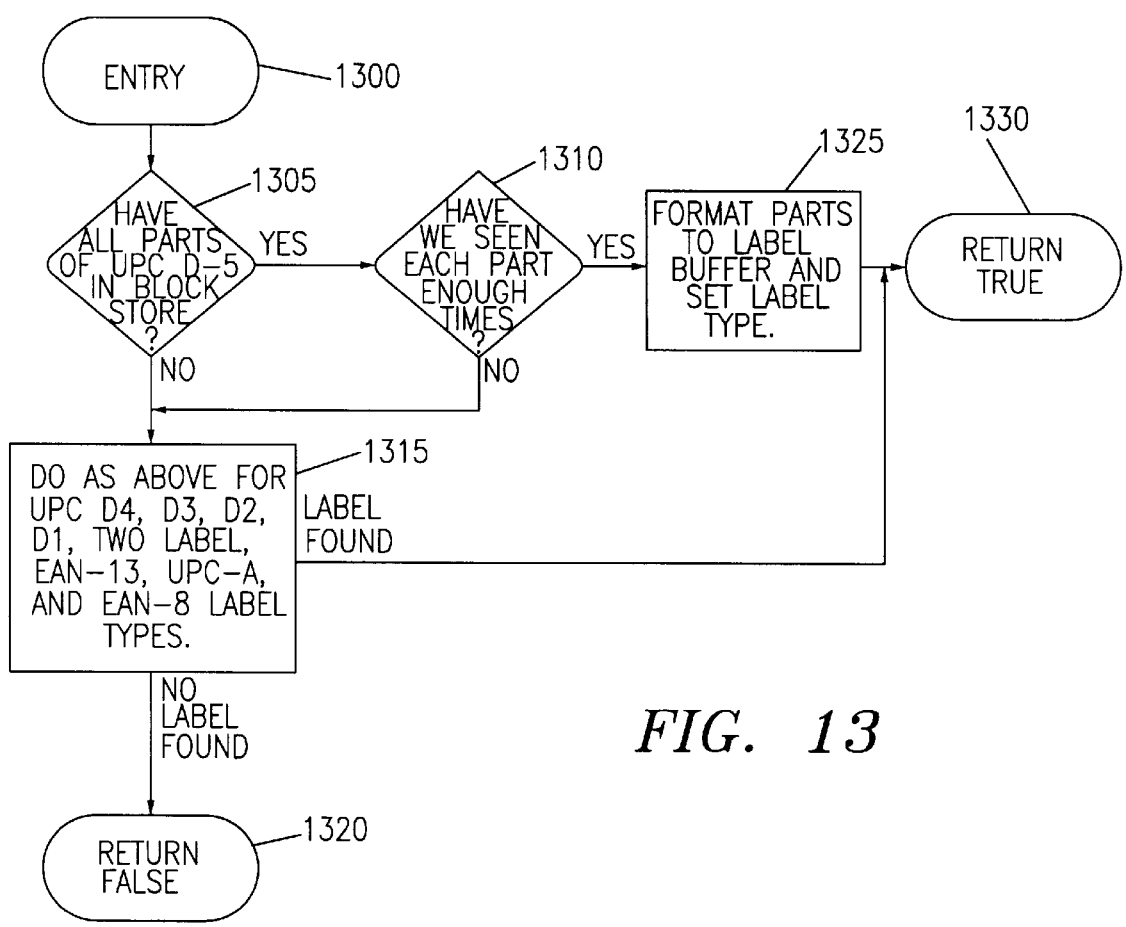

FIG. 13 describes the process utilized to analyze the block storage in order to determine the existence of complete, valid label information from the store of blocks. Upon presentation of a new entry to the block store (step 1300), a determination is made as to the type of label to be assembled and whether all of the parts of that label type are in the block store.

For example, a check may be made first as to whether all parts of a UPC D-5 label are present in the block store (step 1305). If yes, then a determination as to whether each part has been independently observed a sufficient number of times may be made (step 1310) in order to decrease the likelihood of mistaken observation. If all parts are present, and have been observed a sufficient number of times, the parts of the label are formatted and sent to a buffer, and the label type is set (step 1325). The routine is then exited setting a "true" indication that a label has been found (step 1330).

In a similar manner, checks may be made for UPC D4, D3, D2, D1, Two Label, EAN-13, UPC-A, EAN-8, and other label types (step 1315). If all label types are checked and it is determined that all parts to any label are not in the block store, or have not been observed a sufficient number of times, the routine is exited setting a "false" indication that a label has not been found (step 1320).

Having described the invention in detail and by reference to preferred embodiments thereof, it will be apparent that other modifications and variations are possible without departing from the spirit and scope of the invention defined in the appended claims.

What is claimed is:

1. A method for combining scan segments of a bar code label composed of a plurality of bar code elements representing specific structural relationships, wherein the specific structural relationships, including at least a first feature character, a second feature character, and a known number of data characters in between, and wherein the specific structural relationships encode predetermined parameter values, including check sum values, the method comprising the steps of:

(A) scanning the label along a plurality of scan lines and decoding the scanned elements to obtain decoded strings of characters;

(B) determining whether the decoded strings of characters includes one of the first and second feature characters;

(C) repeating the scanning and determining steps until at least a first decoded string of characters with the first feature character and a second decoded string of characters with the second feature character are found, said first and second decoded strings having respective numbers of data characters;

(D) testing whether said first and second decoded strings of characters are combinable and, if so, combining said first and second decoded strings of characters;

(E) determining a parameter value to verify the validity of said combined first and second decoded strings of characters;

(F) comparing the determined parameter value of step (E) to the predetermined parameter value; and (G) in the event that the determined parameter value of step (E) is substantially equal to the predetermined parameter value, validating said combined first and second decoded strings of characters.

2. The method of claim 1 wherein said step (D) testing whether the first and second decoded strings of characters are combinable, further comprises the step of:

detecting a sub-string of data characters common to both said first decoded string of characters and said second decoded string of characters.

3. The method of claim 1 further comprising the steps of:

accumulating said decoded strings of characters in at least one store and wherein said step (D) further comprises:

identifying a sub-string common to both a first stored string and a second stored string;

determining whether said common sub-string is located at opposing ends of said first stored string and said second stored string and, if so, combining said first stored string and said second stored string having said common sub-string at opposing ends thereof into a first processed string by eliminating redundant overlapping characters and maintaining other character positions relative to said common sub-string; and determining whether said common sub-string is located at an intermediate position within at least one of said first or second stored strings and, if so, combining said first stored string and said second stored string having said common sub-string located at an intermediate position within at least one of said first or second stored strings by the steps of:

deleting characters adjacent to said common substring on a first end of said first stored string to form a first intermediate string;

deleting characters adjacent to said common substring on an opposing end of said second stored string to form a second intermediate string;

combining said first and second intermediate strings to form a second processed string by eliminating redundant overlapping characters and maintaining other character positions relative to the common sub-string;

deleting characters adjacent to said common substring on a second end of said first stored string to form a third intermediate string;

deleting characters adjacent to said common substring on an opposing end of said second stored string to form a fourth intermediate string; and, combining said third and fourth intermediate strings to form a third processed string by eliminating redundant overlapping characters and maintaining other character positions relative to the common sub-string.

4. The method of claim 3 wherein steps (E), (F) and (G) further comprise:

examining said processed strings for valid structural characteristics;

discarding said processed strings which are invalid;

determining whether any of said processed strings which are valid comprise a complete block or label; and, storing said validated processed string in a string storage buffer, or, if comprising a complete block, transferring said validated processed string to a block storage buffer.

5. A method for combining a plurality of decoded scan segments of a bar code label, said bar code label comprising strings of data characters and at least two feature characters and exhibiting known structural relationships including a known number of data characters between said at least two feature characters, said decoded scan segments comprising strings of data characters and at least one feature character, the method comprising the steps of:

identifying at least a first decoded scan segment having a first feature character and a second decoded scan segment having a second feature character;

comparing said first decoded scan segment and said second decoded scan segment;

based on the comparison, combining said first decoded scan segment and said second decoded scan segment; and checking the structural relationships of said combined scan segments to verify that valid label characteristics result.

6. The method of claim 5 further comprising accumulating said decoded scan segments in at least one store and wherein said step of comparing further comprises:

systematically comparing said stored decoded scan segments in order to detect a common sub-string at one end of a first stored decoded scan segment and an opposing end of a second decoded scan segment; and retaining certain of said stored decoded scan segments for which no common sub-strings are detected at an end thereof in order to attempt assembly with another of said stored decoded scan segments;

and wherein said step of combining further comprises eliminating redundant overlapping characters and maintaining other character positions relative to the common sub-string.

7. A method for combining a plurality of decoded scan segments of a bar code label, said bar code label comprising at least two feature characters and a known number of data characters therebetween, said decoded scan segments comprising strings of data characters and at least one feature character, the method comprising the steps of:

identifying at least a first decoded scan segment having a first feature character and a second decoded scan segment having a second feature character;

comparing said first decoded scan segment and said second decoded scan segment;

based on the comparison, combining said first decoded scan segment and said second decoded scan segment; and verifying that said combined scan segments comprise said at least two feature characters and said known number of data characters therebetween.

8. A method for combining decoded scan segments of a bar code label composed of a plurality of bar code elements representing at least a first and second feature character, and exhibiting known structural relationships, including check sum values, and a known number of characters between said first and second feature characters, the method comprising the steps of:

scanning the label along a plurality of scan lines and decoding the scanned elements to obtain decoded strings of characters;

determining whether the decoded strings of characters includes one of the first and second feature characters;

repeating the scanning and determining steps until at least a first decoded string of characters with the first feature character and a second decoded string of characters with the second feature character are found, said first and second decoded strings of characters having respective numbers of data characters;

comparing said first decoded string of characters and said second decoded string of characters; and based on the comparison, combining said first and second decoded strings of characters to produce said first and second feature characters having said known number of data characters therebetween.

9. The method of claim 8 wherein said step of comparing said first decoded string of characters and said second decoded string of characters comprises the step of:

detecting a sub-string of data characters common to both said first decoded string of characters and said second decoded string of characters; and combining said first and second decoded string of characters if said sub-string of data characters common to both said first decoded string of characters and said second decoded string of characters is detected and at least one of said known structural relationships is verified.

10. A scanner system for reading bar code labels comprising:

means for receiving an input scan signal representing bars and spaces of a scanned bar code label and for measuring the respective widths of the bars and spaces to provide element width measurements;

first and second microprocessors programmably operating on the element width measurements in a forward and backward direction, respectively, to convert the element width measurements into decoded character data strings; and, a third microprocessor programmably processing decoded character data strings to obtain complete label information.

11. The scanner system of claim 10 wherein said first and second microprocessors operate on the element width measurements in parallel.

12. The scanner system of claim 10 wherein said third microprocessor further programmably assembles decoded character data strings comprising partial label segments.

13. The scanner system of claim 10 wherein said first and second microprocessors comprise a single integrated circuit chip which further comprises a first program store for said first microprocessor and a second program store for said second microprocessor, wherein said first and second program stores may be re-programmed to vary the operation of said first and second microprocessors on the element width measurements.

14. The scanner system of claim 10 wherein said first and second microprocessors comprise high speed processors.

15. The scanner system of claim 10 wherein said third microprocessor comprises part of an assembly subsystem which further comprises means for storing decoded character data strings for subsequent processing and assembly by said third microprocessor.

16. The scanner system of claim 15 wherein said means for storing comprises at least one queue.

17. The scanner system of claim 15 wherein said means for storing comprises a long piece queue and a short piece queue.

* * * * *

UNITED STATES PATENT AND TRADEMARK OFFICE
CERTIFICATE OF CORRECTION

PATENT NO.   : 5,929,421
DATED        : July 27, 1999
INVENTOR(S)  : Craig D. Cherry, and Donald D. Dieball It is certified that error appears in the above-identified patent and that said Letters Patent is hereby corrected as shown below:

Title page,
Under "Related U.S. Application Data" delete "Continuation of application No. 07/995,270, Dec. 22, 1992, Pat. No. 5,493,108,which is a continuation-in-part of application No. 07/961,188, Oct. 14, 1992, abandoned, and a continuation of application no., 08/577,906, Dec. 4, 1995, abandoned." and substitute therefor -- Continuation of application No. 08/577,906, Dec. 4, 1995, abandoned, which is a continuation of application No. 07/995,270, Dec. 22, 1992, Pat. No. 5,493,108, which is a continuation-in-part of application No. 07/961,188, Oct. 14, 1992, abandoned. --

Column 1,
Line 7, after "This application is" insert -- a continuation of application Ser. No. 08/577,906, filed Dec. 4, 1995, now abandoned, which is --
Line 10 after "1992" delete ", and a continuation of application Ser. No. 08/577,906, filed on Dec. 4, 1995, now abandoned"

Signed and Sealed this

Seventh Day of August, 2001

*Attest:*

NICHOLAS P. GODICI
*Attesting Officer*   *Acting Director of the United States Patent and Trademark Office*